US 8,599,172 B2

(12) United States Patent
Park et al.

(10) Patent No.: US 8,599,172 B2
(45) Date of Patent: Dec. 3, 2013

(54) FLAT PANEL DISPLAY WITH BUILT-IN TOUCH SCREEN AND A METHOD OF DRIVING THE SAME

(75) Inventors: Jin-Woo Park, Yongin (KR); Sang-Uk Kim, Yongin (KR); Hee-Chul Hwang, Yongin (KR); Mu-Kyung Jeon, Yongin (KR); Hideo Yoshimura, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 505 days.

(21) Appl. No.: 12/894,343

(22) Filed: Sep. 30, 2010

(65) Prior Publication Data

US 2011/0102365 A1    May 5, 2011

(30) Foreign Application Priority Data

Nov. 3, 2009  (KR) .................. 10-2009-0105454

(51) Int. Cl.
*G09G 5/00* (2006.01)

(52) U.S. Cl.
USPC ......................................................... 345/175

(58) Field of Classification Search
USPC ........................................ 345/175; 178/18.09
See application file for complete search history.

(56) References Cited

U.S. PATENT DOCUMENTS

| | | | |
|---|---|---|---|
| 6,243,069 B1 | 6/2001 | Ogawa et al. | |
| 6,448,550 B1 * | 9/2002 | Nishimura | 250/226 |
| 7,781,990 B2 * | 8/2010 | Huang et al. | 315/360 |
| 8,325,155 B2 * | 12/2012 | Chang et al. | 345/175 |
| 8,350,801 B2 * | 1/2013 | Kato et al. | 345/104 |
| 2005/0219229 A1 | 10/2005 | Yamaguchi | |
| 2006/0044234 A1 * | 3/2006 | Shimonishi | 345/77 |
| 2006/0279557 A1 * | 12/2006 | Gettemy | 345/175 |
| 2008/0136794 A1 * | 6/2008 | Ishikawa et al. | 345/175 |
| 2008/0186289 A1 * | 8/2008 | Ijima et al. | 345/175 |
| 2009/0135318 A1 | 5/2009 | Tateuchi et al. | |
| 2009/0147191 A1 | 6/2009 | Nakajima et al. | |
| 2009/0161051 A1 * | 6/2009 | Fukunaga et al. | 349/115 |

FOREIGN PATENT DOCUMENTS

| | | |
|---|---|---|
| JP | 10-198515 | 7/1998 |
| JP | 11-6991 | 1/1999 |
| JP | 2005-301373 A | 10/2005 |
| JP | 2008-233257 | 10/2008 |
| JP | 2009-031666 A | 2/2009 |
| KR | 10-2006-0049617 A | 5/2006 |

(Continued)

OTHER PUBLICATIONS

JP Office action dated Aug. 14, 2012 of JP 2010-094809, 2 pages.

(Continued)

*Primary Examiner* — Tom Sheng
(74) *Attorney, Agent, or Firm* — Christie, Parker & Hale, LLP (57) ABSTRACT

A flat panel display (FPD) with a photo sensor type built-in touch screen capable of performing a scan operation. The FPD with the built-in touch screen includes a plurality of unit pixels disposed in a display region of the FPD and arranged in pixel groups and photo sensors adjacent to the unit pixels of the respective pixel groups. In a scan operation mode, the plurality of unit pixels in each of the pixel groups sequentially emit light to perform a scan operation using the light emitted from the unit pixels and reflected by a scan object to be scanned to be incident on the photo sensors.

25 Claims, 7 Drawing Sheets

(56) References Cited

FOREIGN PATENT DOCUMENTS

| KR | 10-2008-0044017 | | 5/2008 |
| KR | 10-2008-0089115 | | 10/2008 |
| KR | 10-2009-0055475 | A | 6/2009 |
| KR | 10-2009-0084644 | A | 8/2009 |

OTHER PUBLICATIONS

KIPO Office Action dated Dec. 29, 2011, for KR Application 10-2009-0105454, 1 sheet.

KIPO Office Action dated Apr. 22, 2011 for KR Application No. 10-2009-0105454 (4 pages).

* cited by examiner

FLAT PANEL DISPLAY WITH BUILT-IN TOUCH SCREEN AND A METHOD OF DRIVING THE SAME

CROSS-REFERENCE TO RELATED APPLICATIONS

This application claims the benefit of Korean Patent Application No. 10-2009-0105454, filed Nov. 3, 2009, in the Korean Intellectual Property Office, the disclosure of which is incorporated herein by reference.

BACKGROUND

1. Field

Aspects of the present invention relate to a flat panel display (FPD) with a built-in touch screen and a method of driving the same, and more particularly, to an FPD with a photo sensor type built-in touch screen capable of performing a scanning operation and a method of driving the same.

2. Description of the Related Art

A touch screen is provided on a top surface of an image display device so that a person may select instruction contents displayed on the screen of the image display using a hand or an object contacting the touch screen. The touch screen grasps a contact position and the image display receives the content instructed by the contact position as an input signal to be driven in accordance with the input signal. The image display device having the touch screen is not driven by an additional input device, such as a keyboard or a mouse, coupled to the image display device, and thus, use of the image display having the touch screen is increasing.

Recently, the touch screen is widely used for the FPDs such as a liquid crystal display (LCD), an organic light emitting display (OLED), or other similar display devices. The FPD having the touch screen includes a display panel for displaying an image and a touch screen panel provided on the display panel to detect position information through touch input from a user.

At this time, in order to position the touch screen panel on the display panel, a frame or an adhesive by which an air layer is generated between the display panel and the touch screen panel is used.

In this case, the air layer having a refractive index different from a refractive index of the display panel and the touch screen panel is generated between the display panel and the touch screen panel so that the entire optical characteristic of the FPD deteriorates.

In addition, since an additional touch screen panel is manufactured to be attached to the display panel, manufacturing costs increase and the thickness of the FPD increases.

Therefore, an FPD with a built-in touch screen having the touch screen panel and the display panel are integrated with each other is beneficial.

On the other hand, a photo sensor may be used to detect position information through a touch input from a user. In this case, the part on which external light is incident is distinguished from the part concealed with a contact object such as a hand or a touch stick through the photo sensor to sense a touch position.

In the case of the photo sensor type touch screen, when the object to be scanned is put on the photo sensor type touch screen, when light is radiated on the object using the display panel, light from the display panel is reflected from the object to be scanned to be incident on the photo sensor so that a scanning operation may be performed.

In order to perform the scanning operation in high resolution, a plurality of photo sensors are provided. However, in the case of the FPD with the built-in touch screen, when the number of photo sensors in comparison with the number of pixel units increases, an emission region may be reduced. Therefore, a method of improving scan resolution in comparison with the number of photo sensors is beneficial.

SUMMARY

Aspects of the present invention provide a flat panel display (FPD) with a photo sensor type built-in touch screen capable of performing a scan operation in high resolution and a method of driving the same.

According to an aspect of the present invention, there is provided a flat panel display (FPD) with a built-in touch screen, including a plurality of unit pixels disposed in a display region of the FPD and arranged in pixel groups and photo sensors adjacent to the unit pixels of the respective pixel groups. In a scan operation mode, the plurality of unit pixels in each of the pixel groups sequentially emit light to perform a scan operation using light emitted from the unit pixels and reflected by a scan object to be scanned to be incident on the photo sensors.

According to an aspect of the present invention, the pixel group includes four unit pixels disposed in two rows and two columns and one photo sensor provided in the center of the four unit pixels. The four unit pixels sequentially emit light in a sequential order of a matrix in a scan operation mode.

According to an aspect of the present invention, the unit pixels include a plurality of sub-pixels that emit light of different colors. The plurality of unit pixels in each of the pixel groups sequentially emit light during the scan mode operation and the plurality of sub-pixels in the unit pixels sequentially emit light one at a time.

According to an aspect of the present invention, the unit pixels and the photo sensors are formed on the same substrate.

According to another aspect of the present invention, there is provided a method of driving an FPD with a built-in touch screen including a plurality of unit pixels disposed in a display region of the FPD and arranged in pixel groups and photo sensors adjacent to the unit pixels of the respective pixel groups each including a plurality of unit pixels. The method includes selecting a scan mode, sequentially emitting light from selected ones of the plurality of unit pixels in each of the pixel groups in response to the scan mode, and scanning an object using light emitted from the unit pixels and reflected by the scanned object to be incident on the photo sensors.

According to an aspect of the present invention, the scan operation is performed while the plurality of unit pixels in each of the pixel groups sequentially emit light in a sequential order of a matrix.

According to an aspect of the present invention, a plurality of sub-pixels constituting the unit pixels sequentially emit light in the plurality of unit pixels sequentially emitting light.

As described above, according to aspects of the present invention, the photo sensor is integrated with the display panel to realize the FPD with the photo sensor type built-in touch screen so that the optical characteristic of the FPD is improved, that manufacturing cost is reduced, and that the FPD is made thin.

In addition, according to aspects of the present invention, when the scanning operation is performed by the FPD with the photo sensor type built-in touch screen, all of the pixels of the display panel do not display full-white but the pixels perform a scan operation while sequentially emitting light in the pixel group based on the photo sensor so that the scan operation may be performed in high resolution.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

As referred to herein, it is to be understood that where is stated herein that one film or layer is "formed on" a second layer or film, the first layer or film may be formed directly on the second layer or film or there may be intervening layers or films between the first layer or film and the second layer or film. Further, as used herein, the term "formed on" is used with the same meaning as "located on" or "disposed on" and is not meant to be limiting regarding any particular fabrication process.

Figure 1:
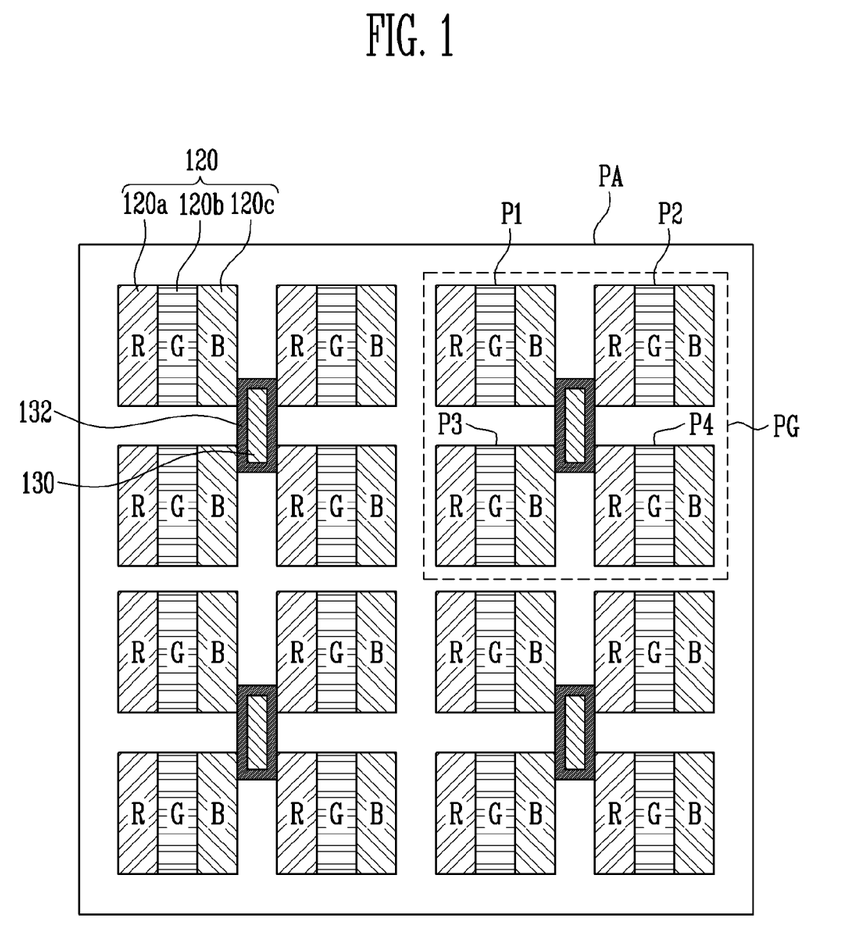
FIG. 1 is a plan view schematically illustrating the display region of a flat panel display (FPD) with a built-in touch screen according to an embodiment of the present invention.

FIG. 1 is a plan view schematically illustrating the display region of a flat panel display (FPD) with a built-in touch screen according to an embodiment of the present invention. Referring to FIG. 1, a plurality of unit pixels 120 are regularly arranged in the display region PA of a flat panel display (FPD) and photo sensors 130 are provided in pixel groups PG, each including a quantity unit pixels 120 from among the plurality of unit pixels 120.

Each of the unit pixels 120 includes a plurality of sub-pixels that emit light components of different colors, for example, an R sub-pixel 120a that emits red light, a G sub-pixel 120b that emits green light, and a B sub-pixel 120c that emits blue light.

The photo sensors 130 are uniformly arranged between the unit pixels 120. When the ratio of the photo sensors 130 to the unit pixels 120 is 1:1, the arrangement density of the photo sensors 130 is maximal.

When the arrangement density of the photo sensors 130 is maximal, the area of the emission region in the display region PA may be reduced. Therefore, according to the present embodiment, the ratio of the photo sensor 130 to the unit pixels 120 is 1:2, 1:4, or less than 1:4. However, aspects of the present invention are not limited thereto and other ratios of the photo sensor 130 to the unit pixels 120 may be used.

That is, according to the present embodiment, the photo sensors 130 are arranged corresponding to the pixel groups PG, each including some of the plurality of unit pixels 120, such that one of the photo sensors 130 is adjacent to corresponding ones of the unit pixels 120. In FIG. 1, the case in which one photo sensor 130 is provided between four adjacent unit pixels 120 of each of the pixel groups PG is illustrated as an example. In other words, the case in which the ratio of the photo sensor 130 to the unit pixels 120 is 1:4 is illustrated as an example.

In FIG. 1, each of the pixel groups PG includes first through fourth unit pixels P1 to P4 arranged in two rows and in two columns, such that each of the unit pixels P1 to P4 are adjacent to two others of the unit pixels P1 to P4 and one photo sensor 130 arranged in the center of the first to fourth unit pixels P1 to P4. A black matrix 132 preventing light emitted from the adjacent unit pixels P1 to P4 or emitted from a backlight to be directly incident upon the photo sensor 130 is formed under the photo sensor 130.

When the hand of a person, a touch stick, or another similar contact object contacts the display region PA of the FPD, an amount of change in light corresponding to a part hidden by the contact object is sensed through the photo sensor 130 to sense the touch position.

Figure 2:
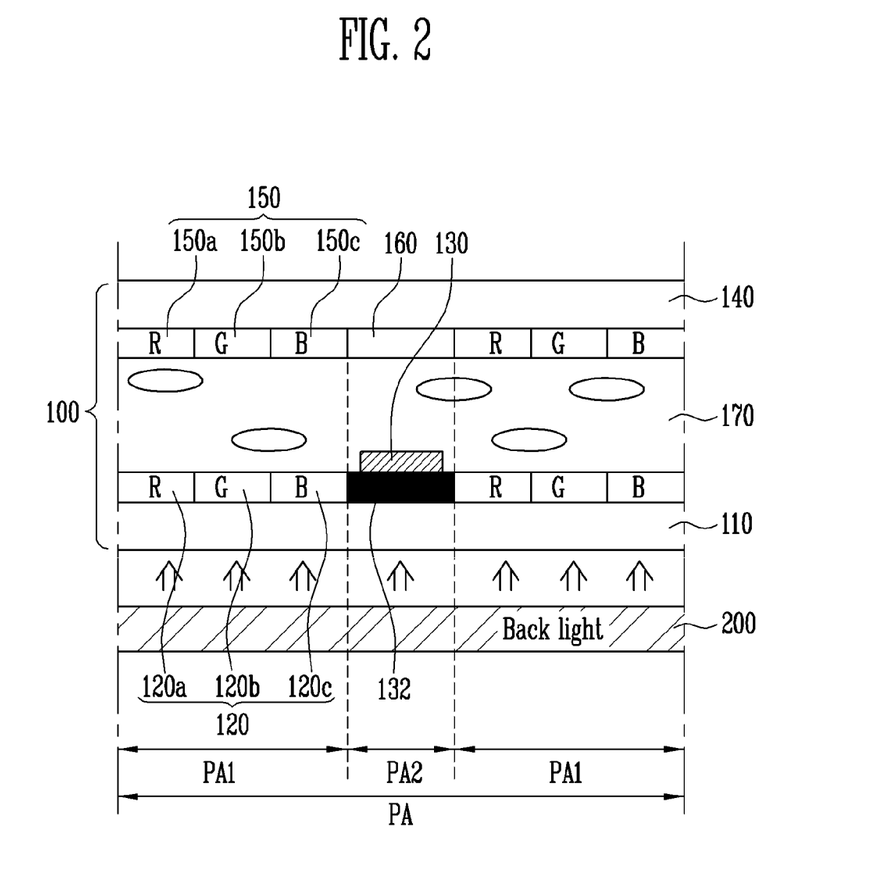
FIG. 2 is a sectional view of a main part of the FPD with the built-in touch screen according to an embodiment of the present invention.

FIG. 2 is a sectional view of a main part of the FPD with the built-in touch screen according to an embodiment of the present invention. In particular, FIG. 2 illustrates a section of the main part of the display region PA of FIG. 1. In FIG. 2, a liquid crystal display (LCD) with a built-in touch screen is shown as an example. However, aspects of the present invention are not limited thereto and an organic light emitting display or other similar displays may be used.

Referring to FIG. 2, the FPD with the built-in touch screen, according to the present embodiment, includes a LCD panel 100 displaying an image and sensing the position of a contact object and a backlight 200 supplying light to the liquid crystal display panel 100.

The liquid crystal display panel 100 includes a bottom substrate 110 disposed above the backlight 200, a top substrate 140 disposed above the bottom substrate 110, and a liquid crystal layer 170 interposed between the bottom substrate 110 and the top substrate 140.

In addition, although not shown in FIG. 2, alignment layers aligning an arrangement direction of the liquid crystal molecules of the liquid crystal layer 170 are formed between the two substrates 110 and 140 and interpose the liquid crystal layer 170. Furthermore, a front surface polarizing plate (not shown) and a rear surface polarizing plate (not shown) are provided to face both sides of the liquid crystal display panel 100.

In particular, according to an embodiment of the present invention, the photo sensor 130 detecting the position of the contact object contacting the LCD panel 100 is provided on a top surface of the bottom substrate 110, wherein the top surface faces the liquid crystal layer 170. The photo sensors 130 are formed to provide a touch panel function of the touch screen in the liquid crystal display panel 100 and are regularly arranged on the display region PA in the bottom substrate.

FIG. 2 illustrates one section of the liquid crystal display panel 100 wherein the photo sensors 130 are regularly arranged in the display region PA. In particular, a section having one photo sensor 130 and two unit pixels 120 adjacent to the photo sensor 130 is illustrated. The part of the display region PA where the photo sensor 130 is formed is a sensor region PA2 and the region in which the unit pixels 120 are formed is a pixel region PA1.

The pixel region PA1 includes the plurality of unit pixels 120 displaying an image. Here, each of the unit pixels 120 includes R, G, and B sub-pixels 120a, 120b, and 120c. The division of colors is determined by the transmission wavelength characteristic of a color filter 150 that the sub-pixels 120a, 120b, and 120c face.

That is, the R, G, and B color filters 150a, 150b, and 150c, corresponding to the colors red, green and blue, are formed on the top substrate 140 in the regions corresponding to the R, G, and B sub-pixels 120a, 120b, and 120c, which are formed on the bottom substrate 110.

On the other hand, although not shown in FIG. 2, a pixel electrode and a common electrode are formed in the pixel region PA1 and are made of a transparent electrode material. In addition, a supplementary capacity supplementing a liquid crystal capacity between the pixel electrode and the common electrode in accordance with a pixel structure is formed in each of the sub-pixels 120a, 120b, and 120c. Also, a switching element controlling a potential applied to the pixel electrode in accordance with the potential of an input image signal is formed in each of the sub-pixels 120a, 120b, and 120c.

The sensor region PA2 includes the photo sensors 130 regularly arranged between two consecutive pixel regions PA1. For example, the photo sensors 130 may be regularly formed on the bottom substrate 110 between two of the pixel regions PA1. The photo sensors 130 sense the position of the contact object.

On the other hand, the backlight 200 is provided on a rear surface of the bottom substrate 110. The backlight 200 is provided to face the rear surface of the liquid crystal panel 100 in order to emit light to the display region PA of the liquid crystal panel 100. Here, the light emitted from the backlight 200 illuminates the pixel region PA1 in the bottom substrate 110 and the color filter 150 on the top substrate 140 in order to display a predetermined image.

The black matrix 132 is formed in the sensor region PA2 and on the bottom substrate 110 in order to prevent light emitted from the backlight 200 from being directly incident on the photo sensor 130. The color filter 150 is formed in the pixel region PA1 on a rear surface of the top substrate 140 so that the color filter 150 faces the bottom substrate 110. A light receiving unit 160, on which external light is incident, is formed in a region corresponding to the sensor region PA2 and in the same surface as the color filter 150.

The light receiving unit 160 is realized by an opening or a transmission layer between the color filters 150 so that external light is incident on the photo sensors 130. However, aspects of the present invention are not limited thereto, and other ways of receiving light may be used to realize the light receiving unit 160. The photo sensors 130 sense a difference in an amount of external light to determine when the external light is blocked by the contact object, whether the contact object is contacting the FPD or not, and to determine where the contact object is positioned.

Although not shown in the present embodiment, when the FPD with the built-in touch screen is realized by an organic light emitting display (OLED), the backlight 200 and the color filter 150 are not utilized or included in the OLED, and the photo sensors 130 are regularly arranged between the unit pixels 120 including self-emitting elements of different colors in the sub-pixels 120a, 120b, and 120c.

As described above, according to the present embodiment, the photo sensors 130 are formed on the bottom substrate 110 of the display panel corresponding to where the unit pixels 120 are formed. That is, the photo sensors 130 are integrated with the display panel in order to realize the FPD with the photo sensor type built-in touch screen so that the optical characteristics of the FPD are improved, and manufacturing costs are reduced, and the FPD is made to be thin.

On the other hand, a scanning function of a scanner may be performed using the FPD with the photo sensor type built-in touch screen. In particular, according to aspects of the present invention, a method of performing the scanning function in high resolution with the arrangement density of the photo sensors 130, even when the ratio of the photo sensor 130 to the unit pixels 120 is 1:2, 1:4, or less than 1:4, is provided.

Figure 3:
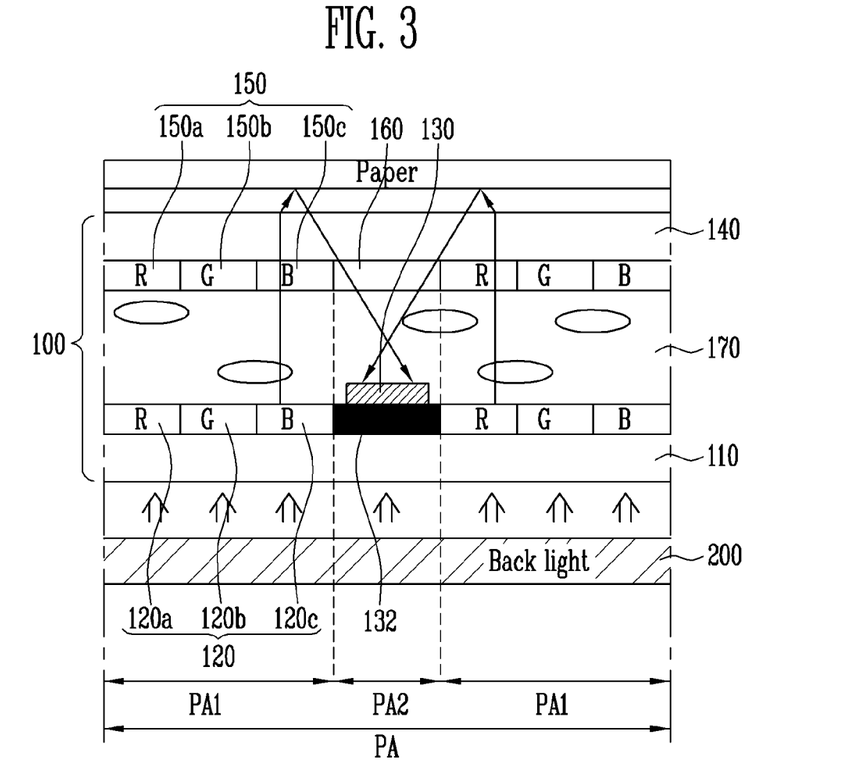
FIG. 3 is a sectional view of a main part illustrating a principle of performing a scan operation using the FPD with the built-in touch screen of FIG. 2.

FIG. 3 is a sectional view of a main part of the FPD with the photo sensor type built-in touch screen and illustrates a principle of performing a scan operation using the FPD with the built-in touch screen of FIG. 2. FIGS. 4A to 4D are plan views sequentially illustrating a high resolution scan method using the FPD with the built-in touch screen according to a present embodiment of the present invention.

First, referring to FIG. 3, when the unit pixels 120 emit light of full-white in a state where paper, having characters or pictures are printed thereon, is put on the display region PA of the FPD, light emitted from the unit pixels 120 is reflected by the paper to be scanned. The reflected light is incident on the photo sensor 130 and the reflected light is analyzed in order to sense the shadow of a scan object so that a scan operation may be performed.

When the ratio of the photo sensor 130 to the unit pixels 120 is 1:2, 1:4, or less than 1:4, the scan operation performed in the state where the unit pixels 120 emit light of full-white is to be performed in low resolution as the arrangement density of the photo sensors 130 is low.

According to aspects of the present invention, in a scan operation mode using the FPD, the plurality of unit pixels 120 in each of the pixel groups PG perform the scan operation using the light emitted from the unit pixels 120 and reflected by the scan object to be incident on the photo sensors 130 while sequentially emitting light instead of simultaneously emitting light. For example, the first to fourth unit pixels P1 to P4 in each of the pixel groups PG may sequentially emit light in the scan operation mode in the order of a matrix, or in other words, sequentially and one at a time.

Figure 4A:
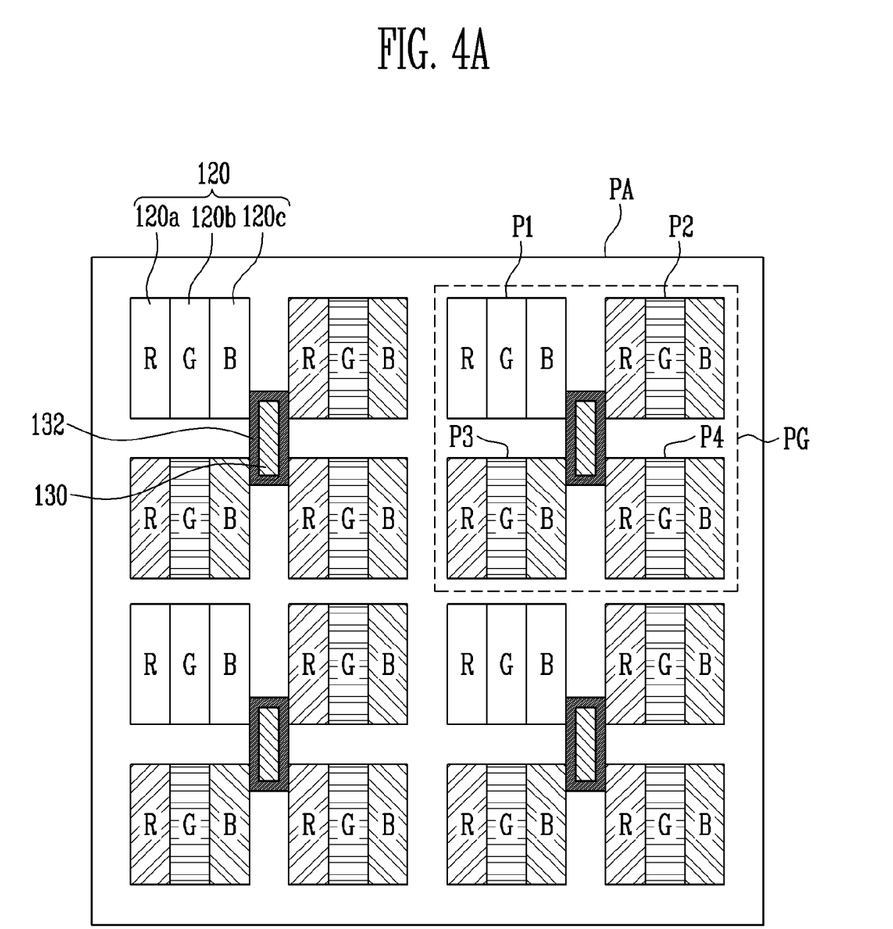
FIGS. 4A to 4D are plan views sequentially illustrating a high resolution scan method using the FPD with the built-in touch screen according to an embodiment of the present invention.
Figure 4B:
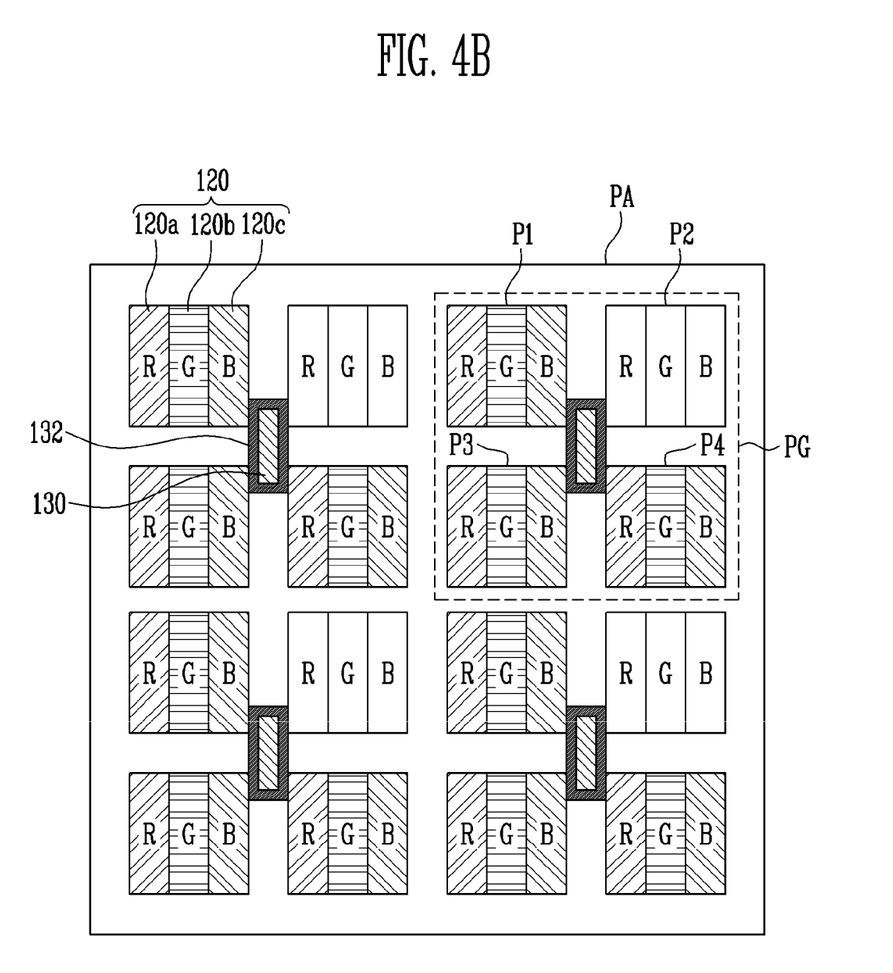
Figure 4C:
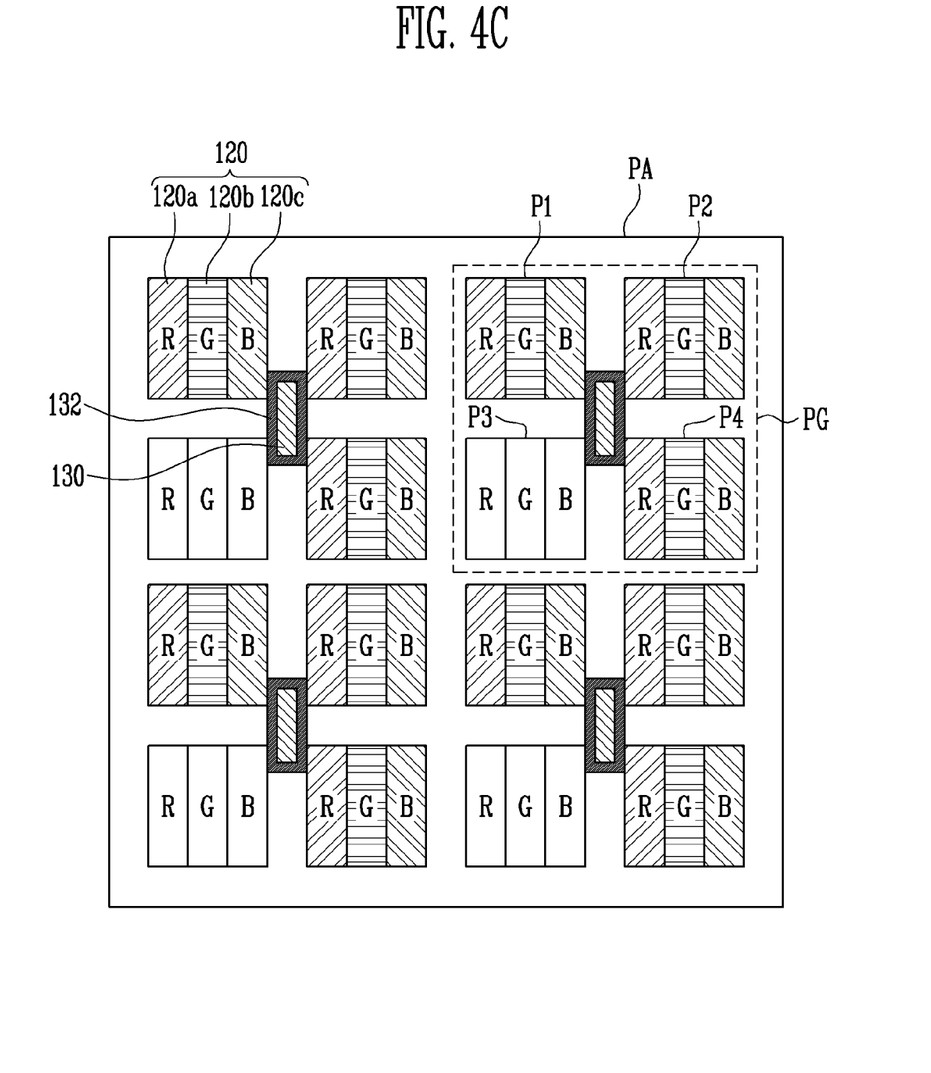
Figure 4D:
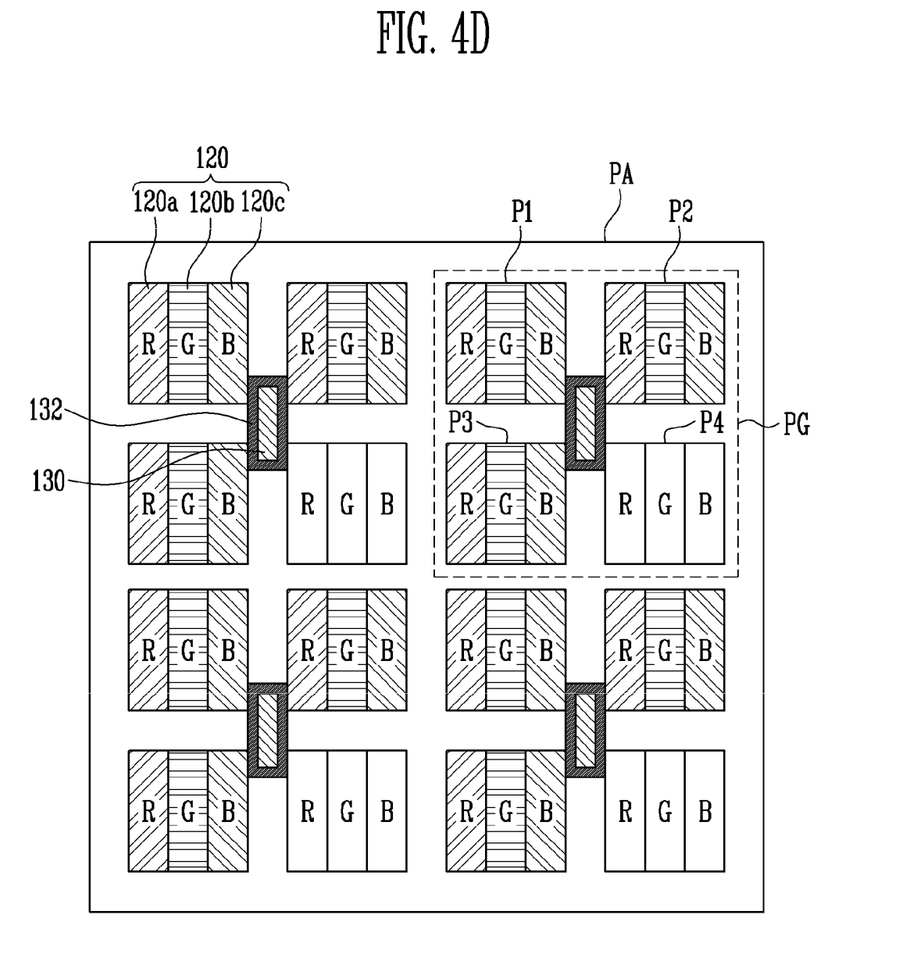

The above will be described in detail with reference to FIGS. 4a to 4D. In a first time period of a scan operation, first unit pixels P1 in the pixel groups PG emit light. In a subsequent second time period, second unit pixels P2 in the pixel groups PG emit light and perform the scan operation (FIGS. 4A and 4B). In a third time period and a fourth time period, which are both subsequent to the second period, the scan operation may be performed while third unit pixels P3 and fourth unit pixels P4 in the pixel groups PG emit light (FIGS. 4C and 4D).

As described above, in the pixel group PG divided based on the photo sensor 130 and including the plurality of unit pixels 120, the scan operation is performed while the unit pixels 120 sequentially emit light so that the resolution of the scan operation may be improved.

For example, as illustrated in FIG. 1, when the pixel group PG is divided into the four unit pixels 120 arranged in two rows and in two columns corresponding to the photo sensor 130, horizontal scan resolution and vertical scan resolution may be increased twice, respectively, in comparison with the case where the scan operation is performed with full-white.

However, aspects of the present invention are not limited to performing the scan operation while the unit pixels 120 included in one pixel group PG sequentially emit light one by one. For example, in order to improve the horizontal scan resolution, while the first and third unit pixels P1 and P3 simultaneously emit light in the first time period of the scan operation and the second and fourth unit pixels P2 and P4 simultaneously emit light in the second time period of the scan operation, the scan operation may be performed.

In addition, in order to improve the vertical scan resolution, while the first and second unit pixels P1 and P2 simultaneously emit light in the first period of the scan period and the third and fourth unit pixels P3 and P4 simultaneously emit light in the second period of the scan period, the scan operation may be performed.

In addition, when it is assumed that a pixel arrangement structure is the same as in embodiments discussed above, in order to perform the scan operation in higher resolution using a limited number of photo sensors 130, the scan operation may be performed using units of the sub-pixels 120a, 120b, and 120c of the unit pixels 120.

For example, the scan period is divided into first to twelfth periods and, while the sub-pixels sequentially emit light in the order of the R sub-pixels of the first unit pixels P1, the G sub-pixels of the first unit pixels P1, the B sub-pixels of the first unit pixels P1, the R sub-pixels of the second unit pixels P2, ..., and the B sub-pixels of the fourth unit pixels P4, the scan operation may be performed. In this case, the horizontal scan resolution may be increased by six times in comparison with the case where the scan operation is performed using full-white.

That is, a method of driving the FPD with the built-in touch screen, according to aspects of the present invention, includes selecting a scan mode and, while sequentially selecting the plurality of unit pixels P1 to P4 in each of the pixel groups PG in response to the selected scan mode to emit light, scanning the scan object using the light emitted from the unit pixels P1 to P4 and reflected by the scan object to be incident on the photo sensors 130.

When the plurality of unit pixels P1 to P4 are sequentially selected, the order of a matrix may be based on user input. However, aspects of the present invention are not limited thereto, and any of the number of cases of permutation to illuminate the unit pixels P1 to P4 may be used.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A flat panel display (FPD) with a built-in touch screen, comprising:
   a plurality of unit pixels disposed in a display region of the FPD and arranged in pixel groups, each of the pixel groups comprising at least two of the unit pixels; and
   photo sensors adjacent to each of the unit pixels of respective ones of the pixel groups,
   wherein, in a scan operation mode, the plurality of unit pixels in each of the pixel groups sequentially emit light to perform a scan operation using the light emitted from the unit pixels and reflected by a scan object to be scanned to be incident on the photo sensors.

2. The FPD as claimed in claim 1, wherein the pixel group comprises:
   four unit pixels disposed in two rows and two columns; and
   one photo sensor provided in a center of the four unit pixels.

3. The FPD as claimed in claim 2, wherein the four unit pixels sequentially emit light in a sequential order of a matrix in the scan operation mode.

4. The FPD as claimed in claim 1, wherein the unit pixels include a plurality of sub-pixels that emit light of different colors.

5. The FPD as claimed in claim 4, wherein the plurality of unit pixels in each of the pixel groups sequentially emit light during the scan operation and the plurality of sub-pixels in the unit pixels sequentially emit light one at a time.

6. The FPD as claimed in claim 4, wherein more than one of the unit pixels in each of the pixel groups simultaneously emit light during the scan operation.

7. The FPD as claimed in claim 1, wherein the unit pixels and the photo sensors are formed on a same substrate.

8. A method of driving a FPD with a built-in touch screen including a plurality of unit pixels disposed in a display region of the FPD and arranged in pixel groups and photo sensors adjacent to each of the unit pixels of the respective pixel groups, each of the pixel groups comprising the plurality of unit pixels, the method comprising:
   selecting a scan mode;
   sequentially emitting light from selected ones of the plurality of unit pixels in each of the pixel groups in response to the scan mode; and
   scanning an object using light emitted from the selected ones of the plurality of unit pixels and reflected by the scanned object to be incident on the photo sensors.

9. The method as claimed in claim 8, wherein the scanning of the object is performed while the plurality of unit pixels in each of the pixel groups sequentially emit light in a sequential order of a matrix.

10. The method as claimed in claim 9, wherein a plurality of sub-pixels constituting the unit pixels sequentially emit light in the plurality of unit pixels sequentially emitting light.

11. The method as claimed in claim 8, wherein more than one of the unit pixels in each of the pixel groups simultaneously emit light during the scanning of the object.

12. A liquid crystal display (LCD) panel including a built-in touch screen, a top substrate, a bottom substrate, a liquid crystal layer interposed between the top substrate and the bottom substrate and a backlight to illuminate the liquid crystal layer, the LCD panel comprising:
   color filters interposed between the top substrate and the liquid crystal layer;
   light receiving units interposed between the top substrate and the liquid crystal layer and adjacent to the color filters;
   unit pixels interposed between the liquid crystal layer and the bottom substrate and arranged in pixel groups, each of the pixel groups comprising at least two unit pixels;
   black matrices interposed between the liquid crystal layer and the bottom substrate and adjacent to each of the unit pixels of respective ones of the pixel groups; and
   photo sensors respectively disposed on a surface of the black matrices facing the liquid crystal layer,
   wherein the photo sensors are disposed below and aligned with the light receiving units in order to sense light.

13. The LCD panel as claimed in claim 12, wherein the pixel groups comprise:
   four unit pixels disposed in two rows and two columns; and
   one of the black matrices having one of the photo sensors provided in a center of the four unit pixels.

14. The LCD panel as claimed in claim 13, wherein the four unit pixels emit light in a sequential order of a matrix in a scan operation mode.

15. The LCD panel as claimed in claim 14, wherein the four unit pixels in each of the pixel groups sequentially emit light during the scan operation mode and each of the four unit pixels comprises a plurality of sub-pixels, wherein the plurality of sub-pixels in the four unit pixels sequentially emit light one at a time.

16. The LCD panel as claimed in claim 12, wherein each of the unit pixels includes a plurality of sub-pixels that emit light of different colors.

17. The LCD panel as claimed in claim 16, wherein the different colors are red, green and blue, and each of the unit pixels comprises three sub-pixels each emitting light of one of the different colors red, green and blue.

18. The LCD panel as claimed in claim 16, wherein the unit pixels and the photo sensors are formed on the bottom substrate.

19. The LCD panel as claimed in claim 12, wherein each of the color filters comprise R, G, and B color filters respectively corresponding to the colors red, green and blue.

20. A method of performing a scan operation on a scan object using an liquid crystal display (LCD) panel with a built-in touch screen including a plurality of unit pixels disposed in a display region of the LCD panel and arranged in pixel groups and photo sensors adjacent to each of the unit pixels of the respective pixel groups, each of the pixel groups comprising the plurality of unit pixels, the method comprising:

initiating the scan operation to scan the scan object disposed on the LCD panel;

sequentially emitting light from selected unit pixels from among the plurality of unit pixels in each of the pixel groups during a plurality of scan periods of the scan operation;

sensing light emitted from the plurality of unit pixels and reflected from the scan object to be incident on the photo sensors; and scanning the scan object using the sensed light.

21. The method as claimed in claim 20, wherein the initiating of the scan operation comprises selecting a first scan operation or a second scan operation.

22. The method as claimed in claim 21, wherein, upon selecting the first scan operation, the sequentially emitting light from the selected unit pixels comprises sequentially emitting light from each one of four unit pixels of the pixel groups one at a time.

23. The method as claimed in claim 22, wherein a plurality of sub-pixels constituting the unit pixels sequentially emit light in the unit pixels sequentially emitting light.

24. The method as claimed in claim 21, wherein, upon selecting the second scan operation, the sequentially emitting light from the selected unit pixels comprises sequentially emitting light from more than one of four unit pixels of the pixel groups at a time.

25. The method as claimed in claim 24, wherein a plurality of sub-pixels constituting the unit pixels sequentially emit light in the unit pixels sequentially emitting light.

* * * * *